United States Patent [19]

Van Patten et al.

[11] Patent Number: 5,319,295
[45] Date of Patent: Jun. 7, 1994

[54] DIGITAL CURRENT REGULATOR

[75] Inventors: Keith Van Patten, Kenosha; William S. Hammel, Franksville; Ramdas M. Pai, Racine, all of Wis.

[73] Assignee: Unico, Inc., Franksville, Wis.

[21] Appl. No.: 798,559

[22] Filed: Nov. 26, 1991

[51] Int. Cl.$^5$ .............................................. G05B 1/02
[52] U.S. Cl. .................................... 318/606; 318/807; 318/810
[58] Field of Search .................... 318/606–608, 318/610, 600–601, 768, 798–802, 807–811

[56] References Cited

U.S. PATENT DOCUMENTS

| 3,761,796 | 8/1973 | Jensen | 318/810 |
| 3,886,430 | 5/1975 | Meier | 318/807 X |
| 3,886,431 | 5/1975 | Meier | 318/807 |
| 4,673,859 | 6/1987 | Shero | 318/810 |
| 5,032,780 | 7/1991 | Hopkins | 318/685 X |

OTHER PUBLICATIONS

"Control Strategies for Direct Torque Control Using Descrete Pulse Modulation", T. G. Habetler, D. M. Divan; pp. 514–522; IEEE 1989.
"Performance Characterization of a New Discrete Pulse Modulated Current Regulator", T. G. Habetler, D. M. Divan; pp. 395–405; IEEE 1988.

Primary Examiner—William M. Shoop, Jr.
Assistant Examiner—D. Martin
Attorney, Agent, or Firm—Reinhart, Boerner, Van Deuren, Norris & Rieselbach

[57] ABSTRACT

A digital current regulator for controlling the operation of an inductance device such as an AC motor. A plurality of independently controllable insulated gate bipolar transistors are selectively enabled to vary the instantaneous phase and magnitude of current applied to an AC motor. To minimize induced back EMFs during current switching operations, a number of safeguards are utilized. Switching between adjacent states only is provided to minimize the magnitude of instantaneous current changes. A "ready blocking" function limits the maximum switching frequency to avoid significantly derating the switching device capabilities, while a "time out" feature assures system operation above at least a minimum switching frequency to further minimize the magnitude of instantaneous current changes. A time hysteresis function is provided to avoid switching device response to false feedback control signals.

15 Claims, 4 Drawing Sheets

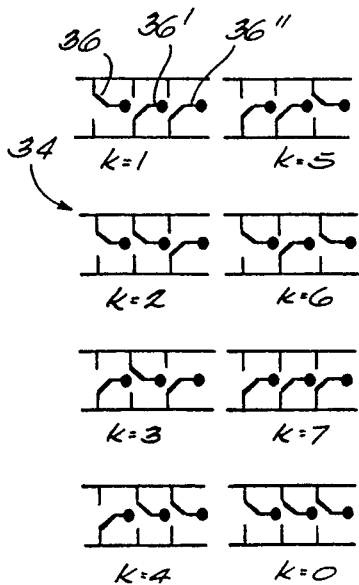
Fig. 2.
| k | DEVICE STATE |
|---|---|
| 0 | 111 |
| 1 | 100 |
| 2 | 110 |
| 3 | 010 |
| 4 | 011 |
| 5 | 001 |
| 6 | 101 |
| 7 | 000 |
Fig. 3
| CURRENT STATE | ADJACENT NEXT STATE | |
|---|---|---|
| 001 | 011 | OR 101 |
| 010 | 110 | OR 011 |
| 011 | 001 | OR 010 |
| 100 | 101 | OR 110 |
| 101 | 100 | OR 001 |
| 110 | 010 | OR 100 |
Fig. 4
| CURRENT STATE | CLOSEST ZERO | FARTHEST ZERO |
|---|---|---|
| 001 | 000 | 111 |
| 010 | 000 | 111 |
| 011 | 111 | 000 |
| 100 | 000 | 111 |
| 101 | 111 | 000 |
| 110 | 111 | 000 |
Fig. 5
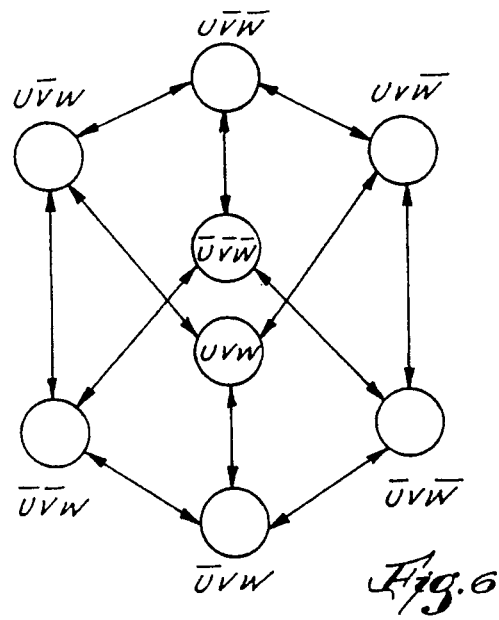
Fig. 6

DIGITAL CURRENT REGULATOR

BACKGROUND OF THE INVENTION

This invention relates generally to current regulators and, more particularly, to current regulators for regulating current in linear or rotating alternating current machines.

Various types of electric motors, such as direct current (DC) and alternating current (AC) motors, are in existence. Although each type of motor has some unique characteristic that renders it suitable for a particular task, each type also has its drawbacks and no one type of motor is suitable for all applications.

DC motors are very useful and versatile because, with such motors, it is very easy to independently control motor speed and torque. However, DC motors require the use of a commutator and its associated brushes. These mechanical elements increase motor cost and complexity, reduce overall ruggedness and reliability and require frequent maintenance.

AC motors, on the other hand, are simpler and more economical in construction, and are more rugged and reliable in operation, than DC motors. However, AC motors are more sluggish in operation than their DC counterparts. Furthermore, it is difficult to control motor speed and torque independently in AC motors. These drawbacks sometime outweigh the advantages of AC motors in certain applications.

In an effort to obtain the operational advantages of DC motors together with the mechanical and economic advantages of AC motors, various controllers for AC motors have been developed. Typically, these controllers have current regulators that vary the instantaneous current to the AC motor in response to a command so as to achieve a desired characteristic in motor operation. In one type of current regulator, a plurality of electronic power switches are coupled to a source of electrical current. A control circuit selectively enables various ones of the electronic switches to change the instantaneous phase and magnitude of the current applied to the AC motor. By properly controlling the phase and magnitude of the motor current, it is possible to control such operational characteristics as torque and motor speed somewhat independently. In this manner, it is possible to mimic DC motor operation using an AC motor. However, because of the large input inductance presented by an AC motor, any abrupt or large magnitude changes in motor current can result in large induced countervoltages or "back EMFs." Unless carefully limited, such back EMFs can destroy the electronic switching devices.

To minimize the magnitude of undesirable back EMFs, some current regulators employ "soft switching" wherein the states of the switching devices are only changed when the instantaneous motor current is near zero. Although this avoids the production of large induced back EMFs, soft switching greatly reduces the maximum effective switching frequency and drastically limits the range of motor response characteristics that can be achieved with "soft switching" systems. "Hard switching" on the other hand, which permits the switching devices to change state even when motor current is non-zero, provides a greater range of achievable motor response characteristics. However, because hard switching can result in abrupt current changes and consequently large induced back EMFs, hard switching is difficult to implement in actual practice.

Typically, current regulators are "load specific" in that they are tailored to (and only work with) motors having specific electrical input specifications. Such regulators are difficult and time consuming to adapt for use with any motor other than the one for which they are designed.

A need exists, therefore, for a switching current regulator that can provide the versatility and responsiveness of a "hard switching" system with the reliability and durability of a "soft switching" system. Such a current regulator working in conjunction with a controller will better enable an AC motor to match the operational characteristics of a DC motor and thereby enhance the versatility of otherwise rugged and reliable AC motors. By making a current regulator "load independent" (i.e., operational with a variety of motors having varying electrical input specifications) system versatility can be further enhanced.

In view of the foregoing, it is a general object of the present invention to provide a new and improved current regulator for induction devices such as AC motors.

It is a further object of the present invention to provide a new and improved current regulator that provides a wide range of attainable, motor operational response characteristics It is a further object of the present invention to provide a new and improved current regulator that is substantially load independent.

It is a further object of the present invention to provide a new and improved current regulator that permits enhanced and substantially independent control of such AC motor operational characteristics as torque and speed.

It is a further object of the present invention to provide a new and improved current regulator that permits hard switching to further increase system versatility and effectiveness.

SUMMARY OF THE INVENTION

The invention provides a current regulator for controlling an alternating current machine device. The current regulator includes an electrical current source and a plurality of electronic switching elements coupled between the current source and the alternating current machine. Each of the switching elements is controllably switchable between a conductive state and a nonconductive state. The current regulator further includes a control circuit coupled to the electronic switching elements and operable to switch selected ones of the electronic switching elements between the conductive and nonconductive states so as to achieve a desired current in the induction device. The control circuit includes structure operatively associated with the electronic switching elements for insuring operation of the current regulator at a switching frequency at or above a predetermined low frequency threshold. Additional structure operatively associated with the electronic switching elements ensures operation of the current regulator at a switching frequency at or below a predetermined high frequency threshold. Still additional structure, associated with the electronic switching elements and responsive to each transition of the electronic switching elements between the conductive and nonconductive states, maintains the electronic switching elements in the respective states for a predetermined minimum time period following each such transition.

The invention also provides a current regulator for regulating current from a current source to an alternating current machine so as to approximate a desired current in the machine device and thereby obtain a desired predetermined operational characteristic from the machine. The current regulator includes a plurality of electronic switching elements couplable to the current source of and to the machine. The electronic switching elements are selectively actuable to predictably alter the instantaneous current supplied to the machine. A current error circuit, responsive to the instantaneous current supplied to the machine, develops an error signal indicative of the degree by which the instantaneous current supplied to the machine deviates from the desired current. A processor circuit, responsive to the current error signal, actuates selected ones of the electronic switching elements as needed to cause the instantaneous current to more closely approximate the desired current. The processor circuit includes a switching frequency control circuit that functions to ensure that the switching frequency of the electronic control elements is maintained between predetermined upper and lower frequency thresholds. A current change limit circuit functions to ensure that the maximum rate of the change of the instantaneous current is kept below a predetermined maximum threshold.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 2 is a conceptual representation of the possible switching states for the AC motor control system shown in FIG. 1.

FIG. 3 is a table of the possible switching states available for the AC motor control system.

FIG. 4 is a table useful in understanding the concept of "adjacent" next states.

FIG. 5 is a table useful in understanding the concept of "closest" and "farthest" zero states.

FIG. 6 is a diagram showing the permissible state transitions provided by the AC motor control system of FIG. 1.

DESCRIPTION OF THE PREFERRED EMBODIMENT

Figure 1:
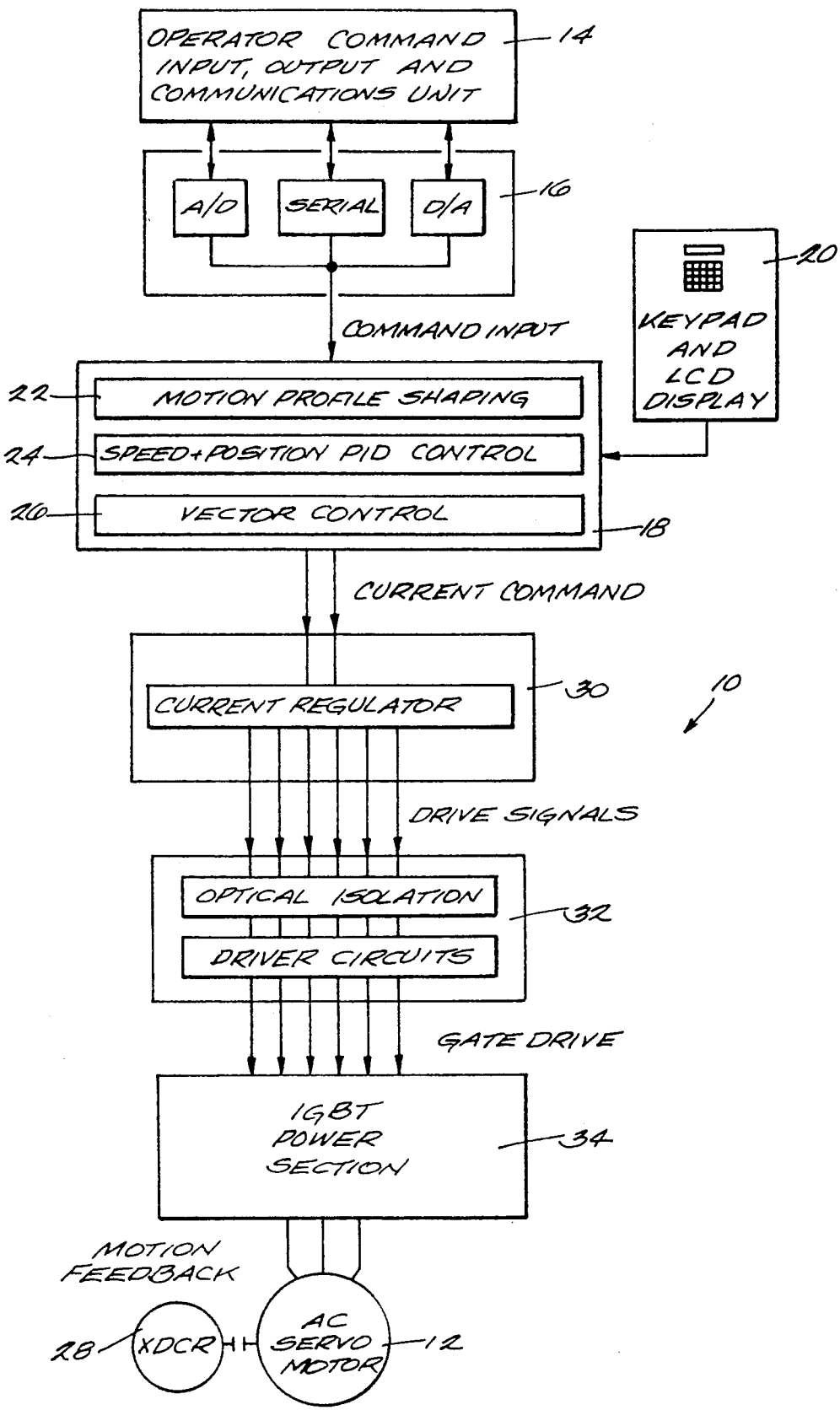
FIG. 1 is a functional block diagram of an AC motor control system including a digital current regulator embodying various features of the invention.

Referring to the drawings, and, more particularly, to FIG. 1, a control system 10 for controlling the operation of an alternating current machine is shown in functional block diagram form. In the illustrated example, the AC machine is a three phase AC servo motor 12. The control system 10 provides the three phase power needed to operate the servo motor 12 and functions, broadly, to vary the magnitude and phase of the power supplied to the motor 12 so as to achieve a desired motor response or velocity profile.

Referring further to FIG. I, the system 10 includes an operator command input, output and communication unit 14 through which system commands are received. A command interface module 16 accepts commands from the operator command input 14 and converts the commands to digital form for further processing by the control system 10. Similarly, the command interface module 16 returns system operating information to the operator or to other processors that may be associated with the control system 10 or the AC servo motor 12.

The control system 10 further includes a controller module 18 that accepts commands from either the command interface module 16 or an external operator keypad 20. The controller module 18 responds to operator inputs received from either the command interface module 16 or the keypad 20 and determines, in known manner, what current should be applied to the AC servo motor 12 to achieve the desired motor response. To this end, the controller module 18 includes a preprogrammed "motion profile" shaping circuit 22 that permits the operator to select any one of a number of desired, preprogrammed, motor velocity profiles. In addition, the controller module 18 further includes a proportional integral/derivative (PID) speed and position control 24 and a vector control 26 that, together with a motion feedback signal derived from a feedback transducer 28 associated with the AC servo motor 12, generate current command instructions as needed to cause the actual AC servo motor velocity profile to approximate the preprogrammed velocity profile specified by the motion profile shaping circuit 22. In other words, the controller module 18 monitors the actual velocity profile of the AC servo motor 12, compares the actual velocity profile to the desired velocity profile specified by the motion profile shaping circuit 22, and thereafter specifies whatever changes in motor current are needed to cause the motor 12 to more closely follow the desired, preprogrammed velocity profile.

The current command instructions generated by the controller module 18 are applied to a digital current regulator module 30 embodying various features of the invention. The digital current regulator module 30 responds to the current commands generated by the controller module 18 and, in turn, develops a series of drive signals that are applied through a gate driver module 32 to a switching power section 34 of known construction. The power switching section, which, in the illustrated embodiment, includes a plurality of insulated gate bipolar transistors (IGBT) coupled to a source of electrical power, responds to the drive signals developed by the digital current regulator module 30 and, in response to these drive signals, controls the magnitude and phase of power applied to the AC servo motor 12.

It will be appreciated that, for any number of reasons, the actual, instantaneous velocity of the AC servo motor 12 may deviate substantially from the desired velocity specified by the motion profile shaping circuit 22. In such an event, the current commands developed by the vector control circuit 26 of the controller module 18 may call for rapid current changes that, if actually implemented, could induce back EMF's sufficient to destroy the switching devices in the IGBT switching power section 34. To avoid such difficulties, the digital current regulator 30, as will be described below, controls the switching of the power section switch devices so as to implement the current commands as rapidly and faithfully as possible consistent with avoiding potentially destructive back EMF's. In this manner, the digital current regulator 30 of the present invention increases the versatility and utility of AC machines, such as AC motors, by expanding the range of velocity profiles attainable by such devices.

To understand the construction and operation of the digital current regulator, it is first desirable to clarify terminology. The "state" of the switching power section can be visualized with reference to FIGS. 2 and 3. FIG. 2 is a conceptual representation of the switching power section 34. As is well known in the art, a switching power section intended for use in, for example, a three phase system will include six separate switch devices arranged in three independently controllable pairs. Each independently controllable pair of switch devices is represented conceptually by one of the single pole double throw "switches" 36, 36', 36" shown in each of the state diagrams of FIG. 2. With three independently controllable "switches," 36, 36', 36" there are eight possible switching states "K" labeled K=0 through K=7. These states are further illustrated in the state table of FIG. 3.

In FIG. 3, the device states for each of the three independently controllable "switches" 36, 36', 36" are shown in the right hand column with the number "1" corresponding to the switch being in the "up" position (FIG. 2) and with the number "0" corresponding to the switch being in the down position. It will be appreciated by those skilled in the art that the representations of FIG. 2 and 3 are a conceptual, rather than literal, depiction of the actual switching devices in the switching power section 34.

Referring further to FIGS. 2 and 3, it will be appreciated that when the states of all three "switches" 36, 36', 36" are the same (i.e., "111" (K=0) or "000" (K=7)) the current applied to the AC servo motor 12 is zero. It will also be appreciated that, because the K=0 and K=7 states are output equivalent (i.e., both result in zero current to the motor 12) there are two available "zero" states and six available "non-zero" states.

The concept of "adjacent" states can be understood by reference to FIG. 4. Two states are considered "adjacent" so long as only one switch transition needs be made to switch between states. For example, and referring to FIG. 3, if the current state is "001," the adjacent states are "011" or "101." Each of the adjacent states can be reached through only one additional switch transition. The state "111" would not be an adjacent state because two additional switch transitions would be needed to reach this state from "001." It should be noted that one of the zero states (i.e., "000" or "111") is always an adjacent state no matter what the current state is. In other words, it is always possible to reach one of the zero states with a single switch transition.

The concept of "closest zero" and "farthest zero" can be understood by reference to FIG. 5. The "closest zero" is the zero state that can be reached through only one switch transition. The "farthest zero" is the zero state that can be reached through two switch transitions. For example, if the current state is "001," the "closest zero" is "000" because this state can be achieved through only one switch transition. On the other hand, the "farthest zero" is "111" because it requires two switch transitions to reach this state from the current state of "001."

In accordance with one aspect of the invention, the digital current regulator 30 only permits transitions between adjacent states, including the closest and farthest zero states. This is illustrated in FIG. 6. In FIG. 6, the three phases of the power supplied to the AC servo motor are designated by the letters U, V and W. Each phase, in turn, can be in either of two states corresponding to the state of the corresponding switching devices controlling that phase. The particular state is indicated by the presence or absence of a negation bar "−" above the corresponding phase designation letter. For example, the designation U V W designates one particular state, while $\overline{U}\,\overline{V}\,\overline{W}$ designates the state that results when each of the "switches" 36, 36', 36" is switched to its opposite state. FIG. 6 depicts, therefore, the state transitions that are possible when only those transitions between adjacent states are permitted. For example, if the current state is U $\overline{V}$ W, the only permitted transitions are to the adjacent next states (U $\overline{V}$ W or $\overline{U}\,\overline{V}$ W) or to the closest zero (U v W). A transition to another state, (e.g., U V $\overline{W}$) which is neither an adjacent next state or a closest zero, is not permitted.

In accordance with another aspect of the invention, various additional means are provided for achieving rapid implementation of the current commands while avoiding the development of excessive back EMF's. In particular, time out means and ready-blocking means are provided for ensuring that the switching devices of the switching power section 34 are, at all times, switched at a switching frequency that lies between predetermined low frequency and high frequency thresholds. In particular, the time out means, which will be described in greater detail below, functions to ensure operation of the current regulator 30 at a switching frequency at or above the predetermined low frequency threshold. Similarly, the ready-blocking means functions to ensure operation of the current regulator 30 at a switching frequency at or below the predetermined high frequency threshold.

To further enhance implementation of the current commands while avoiding excessive back EMF's, the current regulator 30, in accordance with still another aspect of the invention, includes time hysteressis means for holding each of the switching elements in a non-conductive or conductive state for a predetermined minimum period of time or "minimum state time" following the transition of the switching element to the respective state. The minimum state time is determined empirically and is selected so as to avoid the occurrence of state transition "jitters" that can occur due to the non-ideal nature of the feedback currents provided by the motion feedback transducer.

In general, the faster the switching frequency, the more accurately the actual motor current will reproduce the desired current and the more closely the actual motor speed profile will match the desired profile. However, as switching frequency is increased, thermal considerations become significant and the power handling capabilities of the switching elements are derated. As previously noted, the time out means and the ready-blocking means function to maintain the switching frequency between predetermined upper and lower limits. This ensures accurate implementation of the desired current while avoiding significant derating of the switch element power handling capabilities.

Figure 7:
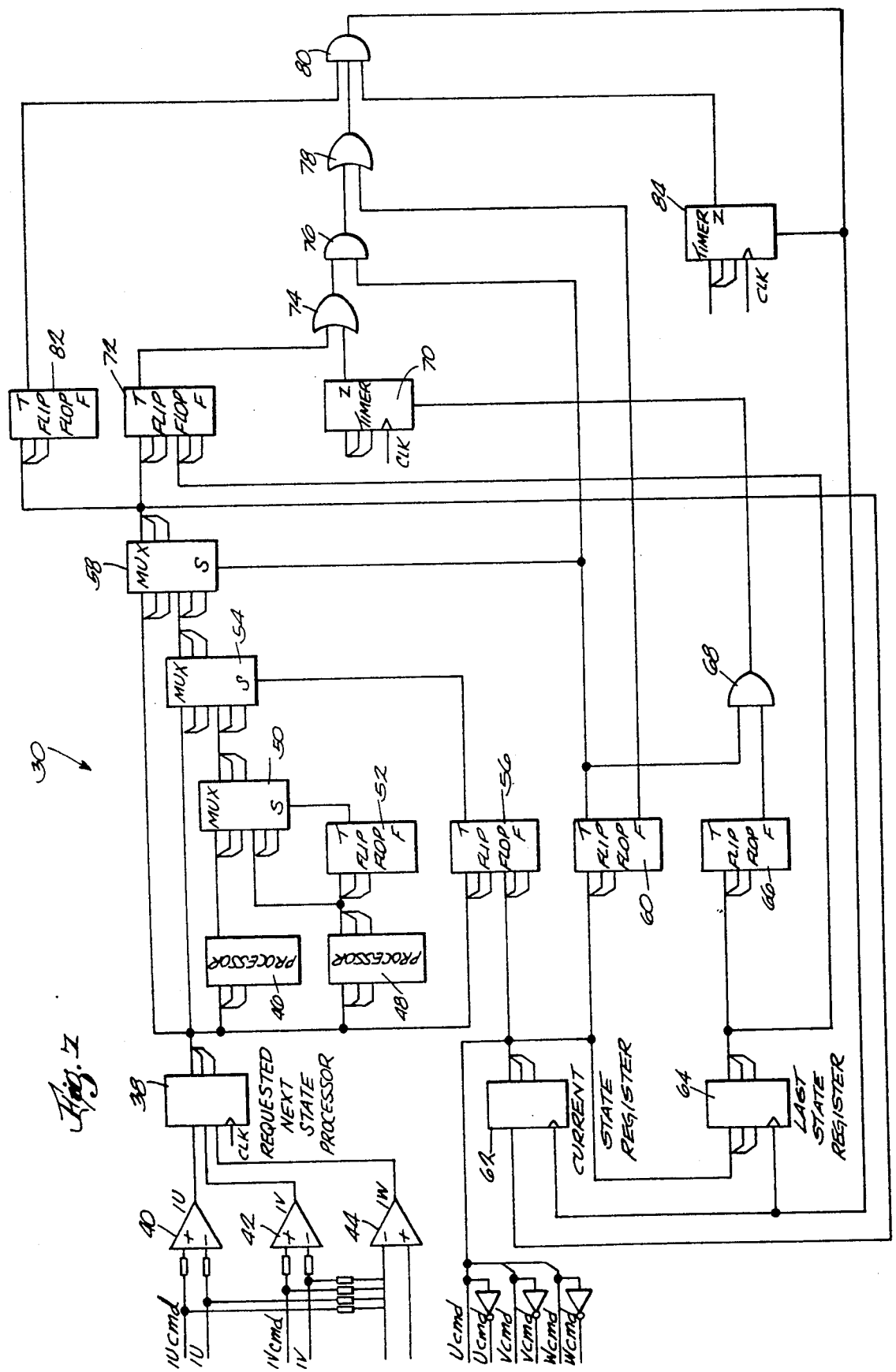
FIG. 7 is a functional block diagram of the current regulator incorporated in the motor control system shown in FIG. 1.

Implementation of the digital current regulator 30 embodying various features of the invention can best be understood by reference to FIG. 7. FIG. 7 is a simplified schematic representation, in terms of conceptual hard wired logic elements, of one possible implementation of the digital current regulator 30. It will be appreciated by those skilled in the art that, in practice, the digital current regulator 30 can be implemented in the form a suitably programmed microprocessor-based system.

As shown in FIG. 7, the current regulator 30 includes a "next state" processor 38 of known construction for determining what the requested "next" state of the switching elements should be, based upon what errors exist between the desired motor current and the actual motor current. It will be appreciated that, in a three phase device, if the actual current in two of the phases is known, the current in the remaining phase can be deduced. Accordingly, the current regulator 30 derives three error signals, $IU_{err}$, $IV_{err}$ and $IW_{err}$ from information provided with respect to two of the phases, U and V. Signals indicative of the desired current, ($IU_{cmd}$) and the actual current ($IU_{fbk}$) existing in phase U are applied to the inputs of a differential amplifier 40 that develops, at its output, the error signal $IU_{err}$ indicative of the current error in phase U. Similarly, a second differential amplifier 42 develops an error signal ($IV_{err}$) for phase V, while a third differential amplifier 44 provides an error signal ($IW_{err}$) indicative of current error in phase W. The error signals are applied to the next state processor 38 that, in known manner, determines what the next state of the switching elements should be based on the various current errors.

Referring further to FIG. 7, the current regulator 30 further includes additional processors 46, 48 that receive the requested next state and, based thereon, determine which of the two available zero states constitutes the farthest zero and the closest zero, respectively, to the request next state. The farthest zero and the closest zero are applied to the inputs of a first two channel multiplexer 50 that, in turn, is controlled by the output of a "device ready" flip-flop 52. The output of the device ready flip-flop 52 determines whether the farthest zero or the closest zero appears at the output of the first multiplexer 50. If the true or T output of the device ready flip-flop 52 is logic high, the output of the first multiplexer 50 will be the closest zero, while if the T output is logic low, the farthest zero will appear at the output of the first multiplexer 50.

The output of the next state processor 38 is also applied to one input of a second, two channel multiplexer 54, while the output of the first multiplexer 50 is applied to the remaining channel of the second multiplexer 54. The "select" input of the second multiplexer 54 is connected to the "true" or T output of a second flip-flop 56 that monitors both the current state and the requested next state and determines whether the requested next state is adjacent to the current state or is one of the zero states. If the requested next state is adjacent to the current state, or if the requested next state is one of the two available zero states, a logic high appears at the T output which is applied to the S input of the second multiplexer 54. When the S input of the second multiplexer 54 is high, (indicating that the requested next state constitutes a permissible transition) the output of the first multiplexer 50 appears at the output of the second multiplexer 54. Otherwise, the requested next state appears at the output of the second multiplexer 54.

The output of the second multiplexer 54 is applied to one channel of a third two channel multiplexer 58. The requested next state is applied to the remaining channel of the third two channel multiplexer 58, while the select or S input of the third two channel multiplexer 58 is connected to the T output of a third flip-flop 60. The third flip-flop 60 monitors the current state and provides a logic high T output in the event the current state is one of the two possible zero states. If the current state is a zero state, the output of the second multiplexer 54 appears at the output of the third multiplexer 58. If the current st is not a zero state, the requested next state appears at the output of the third multiplexer 58.

As further illustrated in FIG. 7, the digital current regulator 30 includes two registers 62, 64 that store state information. One of the registers 62 (the "current state" register) stores the state presently or currently being specified by the current regulator. The second register 64 (the "last state" register) stores the state that existed immediately prior to the current state. When the contents of the current state register 62 are updated, the prior contents are loaded into the last state register 64. Thus, the current state becomes the last state and the next state then becomes the current state. The inverted and non-inverted outputs of the current state register 62 form the commands, U, V, W and $\overline{U}$, $\overline{V}$, $\overline{W}$, applied to the switch devices in the switching power section 34.

An additional flip-flop 66, connected to the output of the last state register 64, determines whether the last state is a zero state. An "and" gate 68 having inputs connected to the T output of the current state zero flip-flop 60 and the F output of the last state zero flip-flop 66 provides a logic high output only when the current state is a zero state and the last state is not a zero state. The output of the "and" gate 68 triggers a "time out" timer 70 that provides a logic high at it Z output a predetermined time after receiving the logic high trigger pulse from the output of the "and" gate 68.

The output of the last state register 64 and the output of the third multiplexer 58 are applied to the inputs of an additional flip-flop 72 that determines whether the output of the third multiplexer 58 is a zero state or is adjacent to the last state. If so, a logic high appears at the T output of the flip-flop 72. The T output of the flip-flop 72 and the Z output of the time out timer 70 are applied to the inputs of an "or" gate 74, the output of which is applied to one input of another "and" gate 76. The remaining input of the "and" gate 76 is connected to the T output of the current state zero flip-flop 60, and the output of the "and" gate 76 is connected to one input of an additional "or" gate 78. The remaining input of the additional "or" gate 78 is connected to the F output of the current state zero flip-flop 60. The output of the additional "or" gate 78 is connected to one input of still another "and" gate 80. One remaining input of the additional "and" gate 80 is connected to the T output of a "device ready" flip-flop 82 that provides a logic high at its T output when the switching devices are ready to accept a further command. The remaining input of the additional "and" gate 80 is connected to the output of a "minimum state time" timer 84 that, after the passage of a predetermined "minimum state time" period following triggering, provides a logic high pulse at its Z output. The output of the "and" gate 80 is applied back to the current state register 62 and the last state register 64 and functions to control the updating of each register. It will be appreciated that such updating only occurs when the "device ready" flip-flop 82 indicates that the devices are ready to receive additional commands, the "minimum state time" timer 84 indicates the passage of the predetermined "minimum state time" period, and a logic high appears at the output of the additional "or" gate 78.

Figure 8:
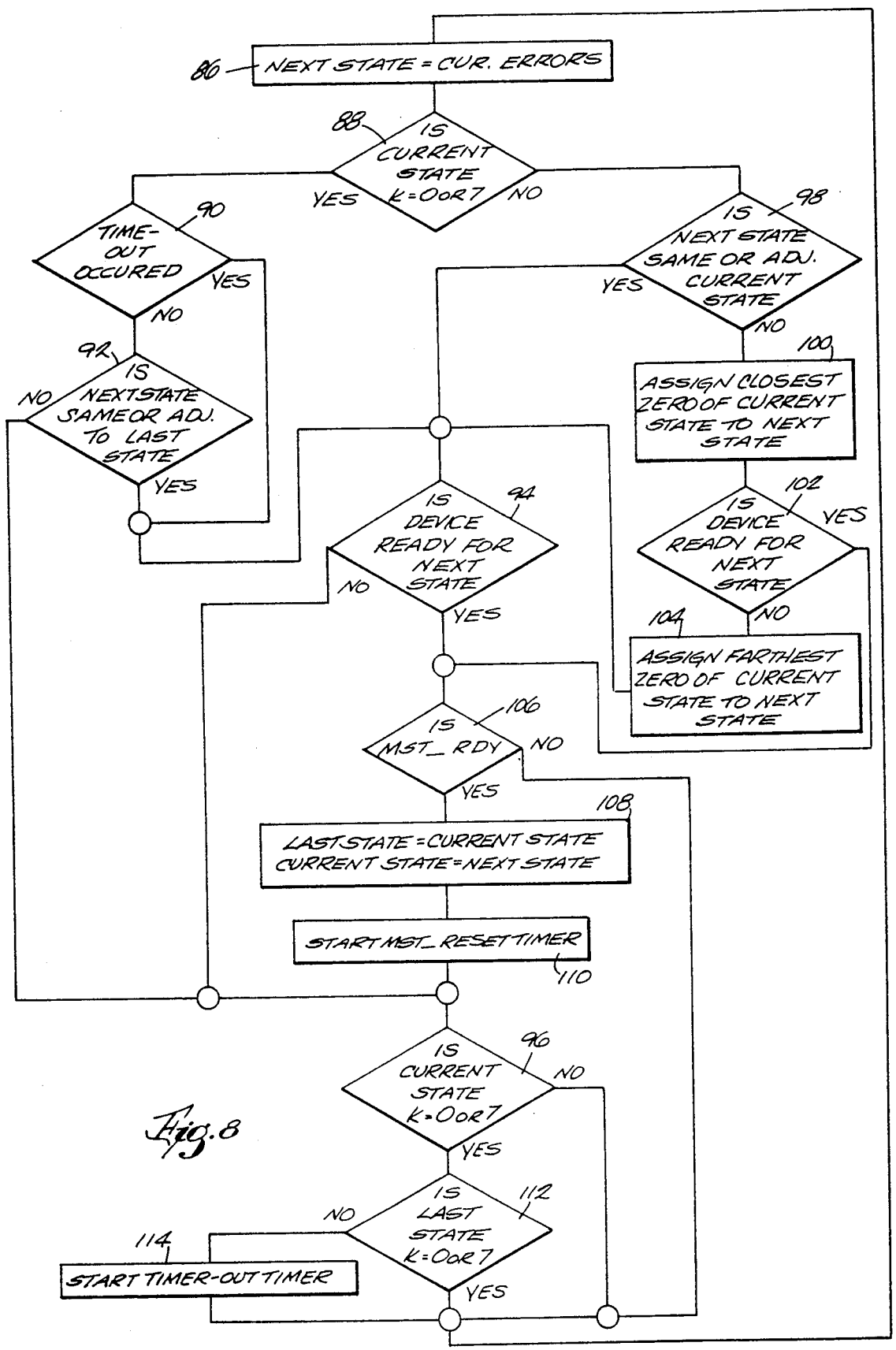
FIG. 8 is a logic flow diagram implemented in one embodiment of a digital current regulator embodying various features of the invention.

The operation of the digital current regulator system 30 can best be understood by reference to the flow diagram of FIG. 8. System operation begins with determination and specification of the next state. As previously noted, the "next" state 86 is determined based on the current errors existing at the moment. At this point, the next state is determined without any consideration to whether it is a zero state or whether it is adjacent to the current state. Such consideration is made subsequently.

Next, the system, at 88, determines whether the current state is one of the two possible zero states. If it is, and if the "time out" period set by the "time out" timer 84 has not yet elapsed (90), the system next determines (92) whether the selected next state is the same as or adjacent to the last state. If it is, system operation progresses to the decision point identified by reference numeral 94. This also occurs if the time out period has elapsed. If the time out period has not elapsed, and the next state is not the same as or adjacent to the last state (92), system operation progresses to the decision point identified by reference numeral 96.

If the current state is not a zero state (88), the system next determines whether the next state is the same as or adjacent to the current state (98). If it is, system operation progresses to the decision point identified by reference numeral 94. If the current state is not a zero state and is not the same as or adjacent to the current state, the system ignores the next state specified by the controller module and instead sets the next state to the closest zero of the current state (100). If the switching devices are not ready to receive the next state (102), the farthest zero of the current state is assigned to the next state, (104), after which system operation progresses to the decision point 94.

At the decision point 94, the system determines whether the switching devices are ready to accept the next state. If they are not, system operation progresses to decision point 96. If they are, the system next determines whether the "minimum state time" period established by the minimum state time timer has elapsed (106). If it has not, system operation reverts back to the beginning (86). In this manner, no state transitions are permitted unless the "minimum state time" has elapsed. This ensures that each state is maintained for at least the "minimum state time" period.

If the "minimum state time" period has elapsed, the current state and last state registers are updated (108) and the minimum state time timer is reset (110). The current state becomes the last state, and the next state becomes the current state. After the current and last state registers are updated, the system next determines whether the current state is a zero state (96). If it is not, the system operation progresses back to the beginning and the cycle is repeated using the updated current and last states.

If the current state is a zero state, the system next determines whether the last state is a zero state (112). If it is not, the time out timer is triggered 114 and system operation remains in this loop until the time out period has elapsed, after which system operation returns to the beginning 86. If the last state is a zero state, system operation immediately progresses back to the beginning.

It will be appreciated that the system operation provides numerous features that permit rapid implementation of the current commands while avoiding the development of excessive, induced back EMFs. First, the system will not permit state transitions except between adjacent states. In addition, the minimum state time timer assures that each selected state is maintained for at least the minimum state time period. Finally, the time out timer helps ensure that state transitions occur at at least a predetermined minimum frequency.

In actual practice, the digital current regulator is preferably implemented in the form a suitably programmed microprocessor based system incorporating the operational flow diagram of FIG. 8. Although the system has been shown and described in the context of driving an AC servo motor, it will be appreciated that the system can be adapted for use with various other forms of alternating current machinery and devices. It will also be appreciated that, although the system has been shown and described in conjunction with insulated gate bi-polar transistors, the system can be used with switching power sections employing other types of switching devices.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A current regulator for controlling an alternating current machine, said current regulator comprising:
   a source of multiphase alternating current;
   a plurality of electronic switching elements coupled between the source of multiphase alternating current and the alternating current machine, each of said switching elements being controllably switchable between a conductive state and a nonconductive state; and
   a control circuit coupled to said electronic switching elements and operable to switch selected ones of said electronic switching elements between said conductive and said nonconductive states so as to achieve a desired current in said alternating current machine, said control circuit comprising:
      timeout means operatively associated with said electronic switching elements for ensuring operation of said current regulator at a switching frequency at or above a predetermined low frequency threshold;
      ready blocking means operatively associated with said electronic switching elements for ensuring operation of said current regulator at a switching frequency at or below a predetermined high frequency threshold; and
      time hysteresis means operatively associated with said electronic switching elements and responsive to each transition of said electronic switching elements between said conductive and nonconductive states, and between said nonconductive and conductive states, for maintaining said electronic switching elements in either of said nonconductive or conductive states for a predetermined minimum period of time following the transition of said electronic switching elements to respective ones of said conductive or nonconductive states.

2. A current regulator as defined in claim 1 wherein said electronic switching elements are capable of being switched from a present state to one or more adjacent states and to one or more non-adjacent states and wherein said current regulator further includes lockout means for inhibiting said electronic switching elements from being switched from an initial state to a non-adjacent state so that switching is permitted only between initial states and adjacent states.

3. A current regulator as defined in claim 2 wherein said current regulator further includes control means responsive to the current drawn by said alternating current machine for switching said electronic switching elements among adjacent states only so as to achieve a desired current in said alternating current machine.

4. A current regulator as defined in claim 3 wherein said electronic switching elements comprise insulated gate bipolar transistors.

5. A current regulator as defined in claim 4 wherein said alternating current machine comprises an AC motor.

6. A current regulator for regulating current from a current source to an alternating current machine so as to approximate a desired current in the alternating current machine and thereby obtain a desired predetermined operational characteristic from the induction device, said alternating current regulator comprising:
 a plurality of electronic switching elements couplable to the current source and to the induction device, said electronic switching elements being selectively actuable to predictably change the instantaneous current supplied to the induction device;
 current error means responsive to the instantaneous current supplied to the induction device for developing an error signal indicative of the degree by which the instantaneous current supplied to the induction device deviates from the desired current; and
 control means responsive to said current error signal for actuating selected ones of said electronic switching elements as needed to change said instantaneous current so as to more closely approximate the desired current, said control means including:
 frequency control means for preventing state transitions of said electronic switching elements except between preestablished upper and lower frequency limits; and
 current change limit means for limiting the maximum rate of change of said instantaneous current to below a predetermined threshold.

7. A current regulator as defined in claim 6 wherein said electronic switching elements are switchable to adjacent and non-adjacent states and wherein said current change limit means functions in part to prevent the switching of said electronic switching elements to said non-adjacent states.

8. A current regulator as defined in claim 7 wherein said frequency control means includes ready blocking means operatively associated with said electronic switching elements for ensuring operation of said current regulator at a switching frequency at or below a predetermined high frequency threshold.

9. A current regulator as defined in claim 8 wherein said frequency control means includes time hysteresis means operatively associated with said electronic switching elements and responsive to each transition of said electronic switching elements for maintaining each of said electronic switching elements in a respective state for a predetermined period of time following transition of said electronic switching element to said state.

10. A current regulator as defined in claim 9 wherein said frequency control means further includes timeout means operatively associated with said electronic switching elements for ensuring operation of said current regulator at a switching frequency at or above a predetermined low frequency threshold.

11. A current regulator as defined in claim 10 wherein said electronic switching elements comprise insulated gate bipolar transistors.

12. A current regulator as defined in claim 11 wherein the alternating current machine is an AC motor.

13. A current regulator as defined in claim 11 wherein the alternating current machine is an AC induction motor.

14. A current regulator as defined in claim 11 wherein the alternating current machine is a synchronous motor.

15. A current regulator as defined in claim 11 wherein the alternating current machine is a brushless DC motor.

* * * * *